United States Patent [19]

Beezer et al.

[11] Patent Number: 4,813,303
[45] Date of Patent: Mar. 21, 1989

[54] POWER DRIVE SPEED REDUCER

[75] Inventors: Earl F. Beezer, Hillsdale, N.J.; Daniel F. Sullivan, Florida, N.Y.

[73] Assignee: Mandreles, Inc.

[21] Appl. No.: 646,129

[22] Filed: Aug. 31, 1984

[51] Int. Cl.⁴ .......................... F16H 1/16; F16D 7/02
[52] U.S. Cl. ............................... 74/425; 74/421 A; 74/625; 74/DIG. 10; 464/46
[58] Field of Search ............ 74/425, 411, 421 A, 74/412 TA, 625, DIG. 10; 464/46, 41, 45; 192/111 B, 56 R, 54

[56] References Cited

U.S. PATENT DOCUMENTS

| | | | |
|---|---|---|---|
| 447,967 | 3/1891 | Moncrief | 192/111 B |
| 2,016,854 | 10/1935 | Cramer | 74/425 |
| 2,686,669 | 8/1954 | Johnson | 74/425 |
| 2,734,393 | 2/1956 | Luenberger | 74/425 |
| 2,857,750 | 10/1958 | Foy | 464/46 |
| 2,868,031 | 1/1959 | Schumb | 74/425 |
| 2,883,875 | 4/1959 | Davidson | 74/DIG. 10 |
| 3,005,361 | 10/1961 | Meyding et al. | 74/625 |
| 3,058,366 | 10/1962 | Matthews | 74/625 |
| 3,216,278 | 11/1965 | Plume | 74/625 |
| 3,319,482 | 5/1967 | Campell et al. | 74/425 |
| 3,339,426 | 9/1967 | Borggrafe | 74/425 |
| 3,635,100 | 1/1972 | Littmann | 74/425 |
| 3,665,786 | 5/1972 | Kobayashi | 74/425 |
| 3,798,990 | 3/1974 | Knappe et al. | 74/411 |
| 3,812,737 | 5/1974 | Campbell et al. | 74/425 |
| 3,851,538 | 12/1974 | Denkowski | 74/425 |
| 4,023,430 | 5/1977 | Imamura | 74/425 |
| 4,086,995 | 5/1978 | Spokas | 192/111 B |
| 4,111,070 | 9/1978 | Statienko | 74/625 |
| 4,215,609 | 8/1980 | Coburn et al. | 83/492 |
| 4,326,849 | 4/1982 | Van Zijderveld | 74/DIG. 10 |

FOREIGN PATENT DOCUMENTS 2405745 8/1974 Fed. Rep. of Germany ........ 74/425

Primary Examiner—Allan D. Herrmann
Attorney, Agent, or Firm—McGlew & Tuttle

[57] ABSTRACT

A speed reducer construction for use with a drive motor which has a drive motor housing and a drive motor shaft which extends out of the housing comprises a reducer housing which is adapted to be coupled to the drive motor housing and encloses a portion of the motor drive shaft. The motor drive shaft is advantageously journalled in the reducer housing and it carries a worm made of a Nylatron material which is rotatable therewith. An output shaft extends transversely to the drive shaft and is journalled in the reducer housing and it carries a sleeve which is keyed thereto for rotation therewith. A gear is freely rotatable on the sleeve alongside a collar portion of the sleeve and is in meshing engagement with the worm. The drive of the motor through the worm to the gear and the output shaft is regulatable by a clutching device including a clutch spring which is biased against an end of the gear with a biasing force which is regulated by a torque adjusting wheel which is threaded on the sleeve. The arrangement permits some slippage between the drive gear and the drive shaft during overload. The worm shaft is adjustable relative to the gear by means of an adjusting knob which may be fitted into an opening in the reducer housing so as to become engaged with the motor drive shaft.

5 Claims, 2 Drawing Sheets

POWER DRIVE SPEED REDUCER

This is a continuation of application Ser. No. 297.326 filed Aug. 28, 1981.

FIELD AND BACKGROUND OF THE INVENTION

This invention relates in general to speed reducer constructions and in particular to a new and useful power drive speed reducer particularly adapted for use with cam operated mechanisms requiring accurate speed control.

A fundamental requirement for a well designed speed reducer for the operation of cam control devices for automatic mechanisms is that it rotate at a constant rotational velocity in order to preserve the parameters which are inherently necessary for optimum dynamics in the movement of the cams and the controlled linkages. Of course with such devices the torque loads will vary considerably and there is a danger that the cam and associated linkages will run ahead of the driving means unless the driving mechanism is arranged so that it may be accurately and positively connected to the associated cam elements which are driven thereby. In the known devices the speed reducers undergo considerable slowdowns for positive torque build up and they are subject to a speed up when the torque is removed or reversed as is the case with the operation of a spring biased cam. In most cases when spring biasing devices are employed there is considerable weight acting on the fore portion of the cam. The presence of excessive backlash in the gearing is apt to cause jumping ahead of the mechanism. All of these conditions contribute to a nonuniform rotation of the mechanism cams causing unacceptable component output motions in many instances.

SUMMARY OF THE INVENTION

The present invention provides an improved speed reducer construction which includes a speed reducer housing which is connectable to a drive motor and may be similarly mounted so that its output shaft will be easily connectable to a control mechanism such as a rotatable cam for controlling mechanical operations. A feature of the construction is that the worm on the drive shaft of the motor may be adjusted rotatably in respect to the driven gear contained on an output shaft journalled in the speed reducer housing. A further feature includes the mounting of the drive gear on the output shaft on a sleeve which has a collar portion and which includes an adjustable clutch mechanism which biases the gear against the collar portion with a predetermined tension so that the drive through the gear to the output shafts will not cause a disengagement of the gear with the worm and a change in the operating speed of the mechanism.

The speed gear housing is designed to permit installation of a maximum pitch diameter worm gear. For example it is possible to manufacture them in sizes with a 4.200 pitch diameter; a 6.00 pitch diameter and a 9.000 pitch diameter worm gear. Such a system provides a sufficient pitch diameter to meet present requirements for speed and torque to drive cam operated components of automatic control mechanisms.

The invention also provides a worm and also advantageously a gear driven by a worm which is made of a Nylatron material. Such a material contains finely divided particles of molybdemun disulfide solid lubricant uniformly dispersed throughout its contact to provide extra surface lubricity which has been found to reduce power required for start up and stop operations. By specifically selecting the nozzle material, it has been found in accordance with the present invention that a low coefficient of dynamic friction is produced to increase the efficiency and reduce the speedup and slowdown of the drive mechanism to a minimum and reduce heat build up. It also makes it possible to increase the diametrical pitch of the gear teeth to compensate for lower allowable stress of the Nylatron compared to metal for example. It makes it possible to retain approximate gear ratios with larger pitch diameter worm gear.

With the inventive arrangement the end of the motor drive shaft containing the worm is provided with a fitting which may be engaged by rotatable hand operated knob to provide adjustment between the worm and the gear for setting up arrangements where the device is connected to control operating cams. The invention also makes it possible to adjustably connect the drive gear to its output shaft by the simple rotation of a torque adjusting bar which engages in a radial opening of an adjusting wheel so as to vary the tension on a cup spring acting on a side face of the gear. The arrangement makes it possible to have an integral and adjustable slip clutch for overload protection. The mechanism will not get out of phase with the machine since control cams usually include external switches which monitor drive component cams for cycle on demand applications. An integral slip clutch provides a cushion to near instant stopping of the motor and worm shaft. With the angular position of the stopping of a driven shaft approximately 2 to 5 percent repeatability is possible depending upon the inner and normal clutch setting but with the previous devices there was near instant stopping of the drive when dynamically braking of the drive motor resulting in heavy shock forces on the worm and worm gear teeth due to the mass inertia of moving parts being driven.

The mechanism of the invention also makes it possible to provide minimum backlash or pitch 1 selective fitting of the worm and the gear and the output shaft at assembly. Because of the low friction due to the Nylatron worm gear therefore less heat buildup permits low or substantially no backlash. The low conductivity of the Nylatron compared to bronze or aluminum for example further prevents any heat buildup.

Accordingly it is an object of the invention to provide an improved speed reducer construction for use with a drive motor having a drive shaft which includes a reducer housing enclosing a portion of the shaft, the shaft carrying a worm arranged in the housing which is connected to the drive shaft for rotation therewith and drives a gear of an output shaft which is freely rotatable on a sleeve key to the shaft and which includes an adjustable clutch-like mechanism threaded onto the sleeve which may be rotated to adjust the biasing force of a cup spring against the side of the gear so as to provide a controlled slipping pressure for the gear in order to prevent destruction of any driven mechanism.

A further object of the invention is to provide a speed reducer construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF PREFERRED EMBODIMENTS

Figure 1:
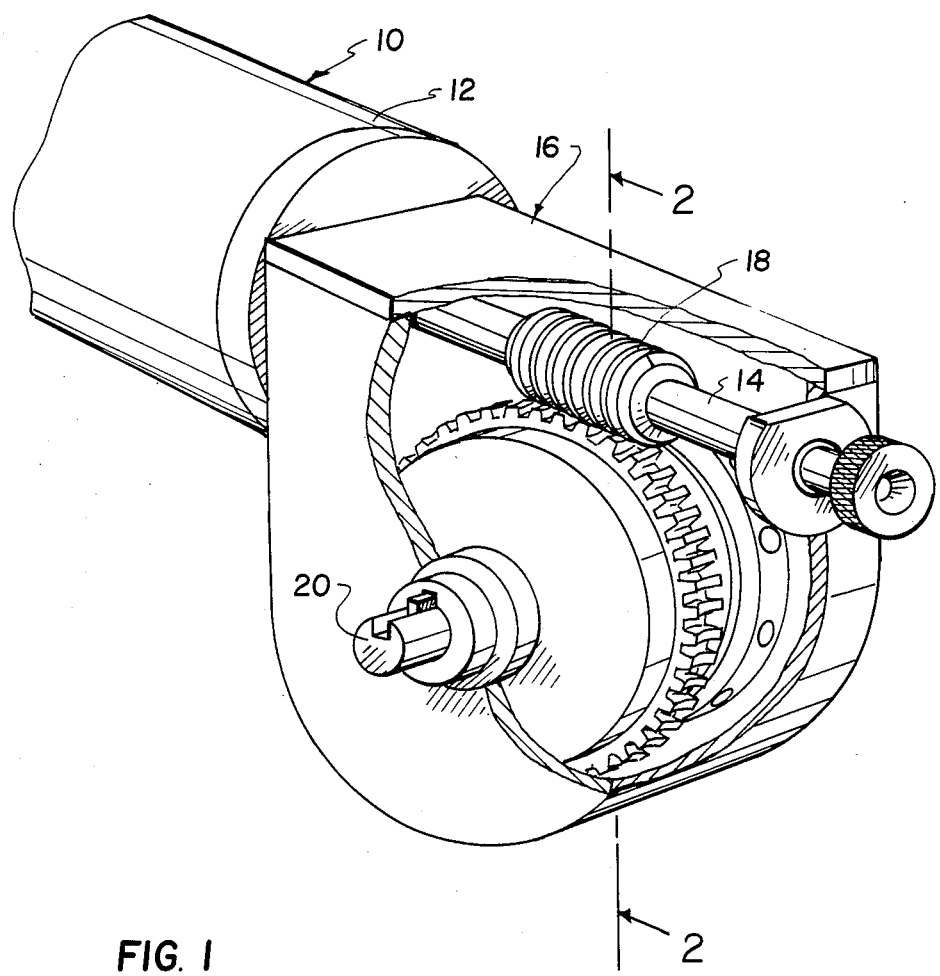
FIG. 1 is a front top perspective view, partly broken away, of a speed reducer constructed in accordance with the invention.

Referring to the drawings in particular, the invention embodied therein comprises a speed reducer construction for use with a drive motor 10 having a drive motor housing 12. The motor 10 is used in association with a reducer housing 16 which encloses a portion of a drive motor shaft 14 which extends out of the housing 10 and is journalled in bearings 17 and 17' arranged in end walls 16a and 16b of the reducer housing 16.

In accordance with the invention a worm 18 having a pitch diameter of any selected value may be easily accommodated within the reducer housing 16 and it is advantageously made of a Nylatron material having the capability of reducing or eliminating lubrication and providing longer wear and the protection of the mating parts and in accordance with a feature of the invention reducing power required for start and stop operations. The arrangement of the worm 18 in the housing 16 is such that 50 to 100% larger pitch diameter of the worm gear is possible permitting larger pitch teeth and greater arc of contact. The worm 18 is connected to the two or formed integrally with motor drive shaft 14.

The housing 16 and its side walls 16d and 16e with bearings 19 and 19' respectively forming journals for the rotational support of the output shaft 20 which extends transversely to the motor drive shaft 14. A sleeve 22 is mounted on and connected to the output shaft 20 for rotation therewith and it has a collar portion 22a disposed alongside a gear or pinion 24 which is engaged with the worm 18. Gear 24 may also be made of Nylatron material which permits minimal speed variation of the drive due to lower friction and a large pitch diameter of the worm 14 and little or no backlash between the worm 14 and the gear 24.

In accordance with a further feature of the invention clutch means generally designated 26 provides an integral and adjustable slip adjustment between the drive of the gear 24 and its associated output shaft 20. The clutch means 26 includes a cup spring or resilient spring disc 28 which is engaged over the sleeve 22 and rides on a ledge of a torque adjustment wheel 30 which is threaded on the sleeve 22. Rotation of the torque adjustment wheel 30 causes its threaded advance in a selected direction either toward or away from the gear 24 so as to either increase or decrease its biasing pressure engagement with the gear 24 so as to vary the load which will cause slippage between the gear 24 and the collar 22 of the sleeve 22 and the associated output shaft 20. The integral and adjustable slip clutch means 26 provides for overload protection and provides a cushion to accommodate substantially instant stopping of the drive motor 10 and the drive motor shaft 14 carrying the worm 18. Construction is such that angular positioning of the stopping of the output shaft 20 may be controlled within 2 to 5 percent repeatably depending on the inner and normal clutch setting.

Figure 2:
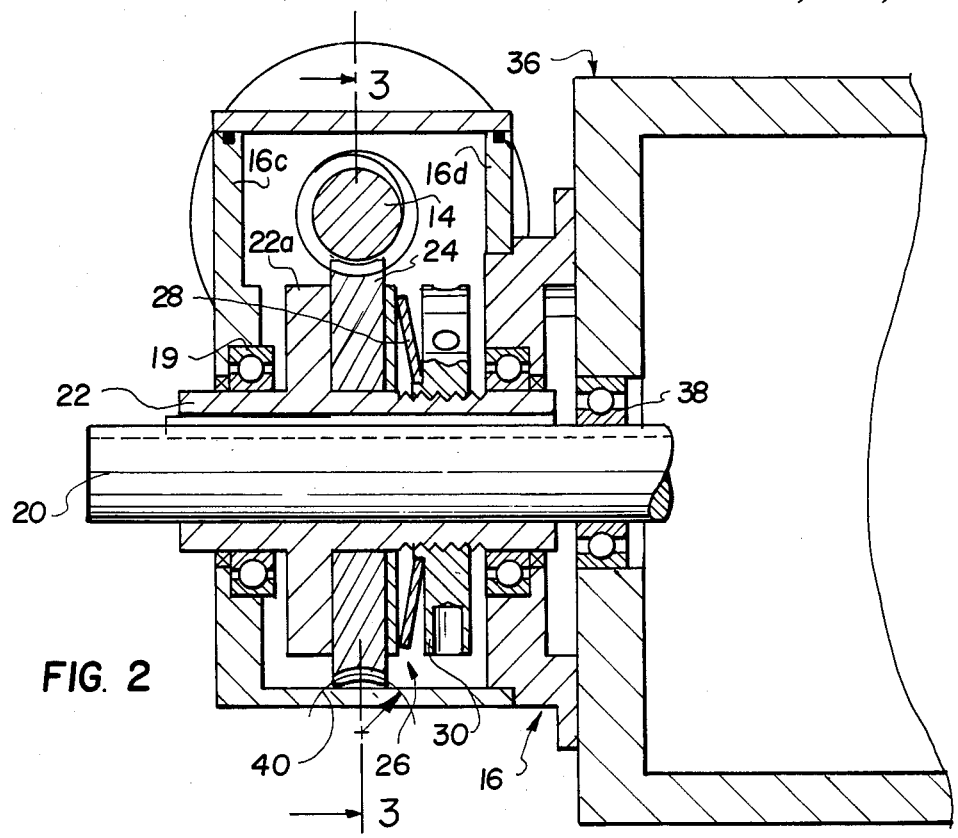
FIG. 2 is a section taken on the line 2—2 of FIG. 1.
Figure 3:
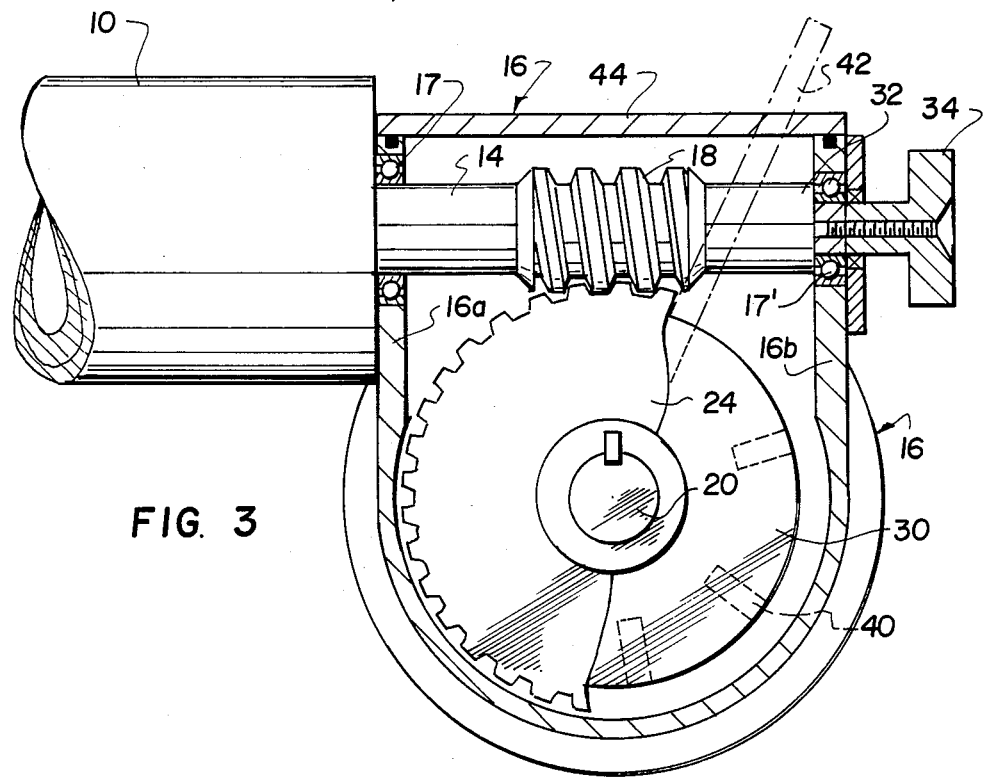
FIG. 3 is a section taken along the line 3—3 of FIG. 2.

In accordance with another feature of the invention the motor drive shaft 14 has an exposed adjustment end 32 which is accessible through an opening in the wall 16d so that the worm 18 may be rotatably adjustably positioned in respect to the gear 24. This adjustment may be easily carried out by the use of a hand knob 34 which is connected to the drive shaft 14 for rotation therewith and which may be rotated by hand in order to adjust the setting of the speed reducer output shaft 20 during setup of the operation of a device for example such as a cam control mechanism which is carried in a housing generally designated 36. If such a mechanism is used with the speed reducer the cam control housing 36 is positioned alongside the speed reducer housing 16 and the output shaft 20 is journalled on bearings 38 in an end wall of the cam operating mechanism housing. In such a case the shaft 20 would carry one or more cams which would operate various control mechanisms. The arrangement permits easy adjustment of the output shaft 20 to the desired angular position during setup of the control mechanism in the cam control housing 36 and its attachment to the speed reducer. The whole speed reducer element including the drive motor may be contained in a minimum sized envelope with a capacity which it will produce. Reducer housing 16 and the drive motor housing 12 are advantageously made with finished surfaces to facilitate mounting of the accessories or other components on them and the instant connection to operating parts or control parts. The arrangement of the mechanism in the housing 16 also permits a large arc of contact 40 as shown in FIG. 2 between the gear teeth 24 and the worm 18.

In order to facilitate the turning of the torque adjustment wheel 30 it is provided with a plurality of circumferentially spaced radially extending bores 40 which are engaged by a turning bar 42 which may be inserted into the housing 16 after a cover 44 is removed. The bar 42 is moved to rotate the wheel 30 to achieve the desired tightening or loosening of the biasing force acting on the cup spring 28.

The speed reducer of the invention permits installation of maximum pitch diameter worm gears consistent with preestablished housing sizes. The use of Nylatron material for the worm gears insures:

1. Low coefficient of dynamic friction to increase efficiency, reduce speed up and slow down to a minimum and reduce heat buildup.

2. Provides an ideal material for integral slip clutch constructions arranged in an oil bath.

The use of a manual feed knob such as the knob 34 permits fine adjustment of the components of the operating mechanism for set up and eventual timing of any devices such as the cam control devices of the housing 36. The torque adjusting wheel may be easily positioned to obtain the desired overload safety. The arrangement of the gears in the housing permits an increased size of the gear teeth to compensate for lower allowable stress of a Nylatron material compared to metal and makes it possible to retain the large gear ratios with larger pitch diameters of worm gears.

While specific embodiments of the invention have been shown and described in detail to illustrate the application of the principles of the invention, it will be understood that the invention may be embodied otherwise without departing from such principles.

What is claimed is:

1. A motor driven speed reducer, comprising a drive motor having a motor housing end wall and a drive shaft extending through said end wall, a reducer housing having a substantially U-shaped wall with a first end connected to said motor housing end wall and a second end, said drive motor shaft extending through the journal in the respective ends of said U-shaped wall of said reducer housing, a worm of a material having finely divided particles of solid lubricant connected to said drive motor shaft for rotation therewith, said reducer housing having a side wall on each side of said U-shaped wall, an outboard shaft extending through said side walls of said reducer housing and journalled in said side walls for rotation therein, a sleeve in said reducer housing surrounding said output shaft and affixed thereto for rotation therewith and having an integral sleeve collar portion extending radially of said shaft, a gear of a material having finely divided particles of solid lubricant in meshing engagement with said worm and being freely rotatably mounted on said sleeve, a clutch including an axially extending and axially acting clutch spring engaged on said sleeve adjacent a side of said gear, a torque adjustment wheel threaded on said sleeve and being axially displacable by threading along said sleeve against said clutch spring to engage against and bias said clutch spring axially against said gear to regulate possible slippage between said gear and said collar under loading said speed reducer housing and sidewalls having bearing means journalling said output shaft, and a rotatable adjusting knob connected to said shaft at the end thereof extending through said reducer housing which is remote from said drive motor and being rotatable to rotate said shaft with said worm to adjust the engagement of said worm with said gear.

2. A motor driven speed reducer as claimed in claim 1, wherein said torque adjustment wheel includes a plurality of radially extending bores having circumferential openings for receiving a tool for rotating said torque adjustment wheel.

3. A speed reducer according to claim 1, wherein said speed reducer housing includes a wall having bearing means journalling said drive motor shaft, said drive motor shaft having an adjustment end journalled in said wall and a knob portion extending outwardly of said wall and connected to said shaft for the hand adjustment of said drive motor shaft.

4. A speed reducer according to claim 1, wherein said clutch means comprises a torque adjusting wheel threaded on said sleeve, a cup spring disposed between said torque adjusting wheel and said gear, said torque adjusting wheel being rotatable to vary the tension on said spring.

5. A speed reducer according to claim 1, wherein said torque adjusting wheel includes a plurality of radially extending circumferentially spaced bores providing bar engagement recesses, said housing having a cover which is removable to permit insertion of a bar into said housing for adjusting said torque wheel.

* * * * *